Oct. 16, 1951  J. C. MOUZON  2,571,746
CONVERSION APPARATUS
Filed May 6, 1950  2 SHEETS—SHEET 1
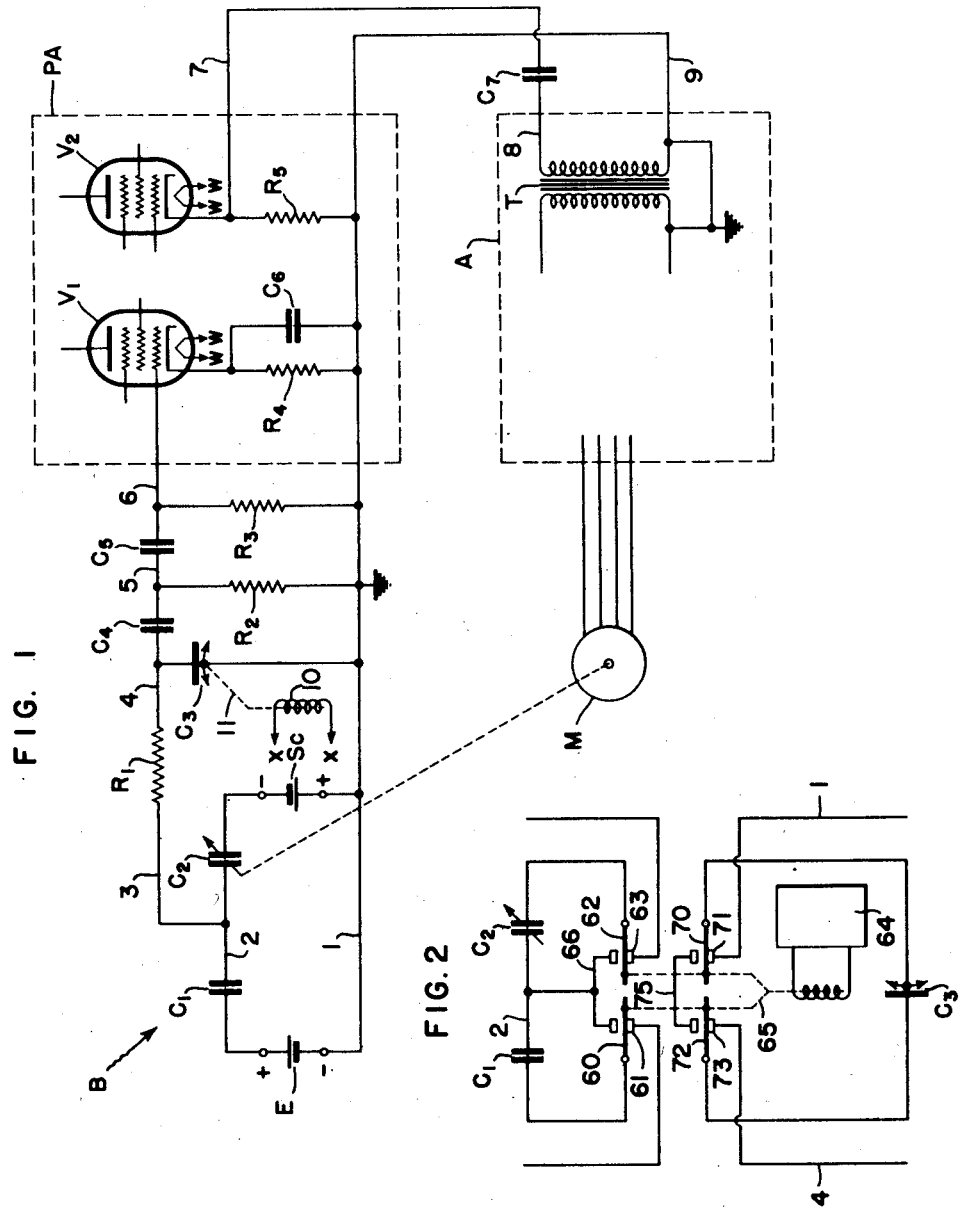
INVENTOR.
JAMES C. MOUZON
BY
*Arthur H. Swanson*
ATTORNEY.

Oct. 16, 1951   J. C. MOUZON   2,571,746
CONVERSION APPARATUS
Filed May 6, 1950   2 SHEETS—SHEET 2
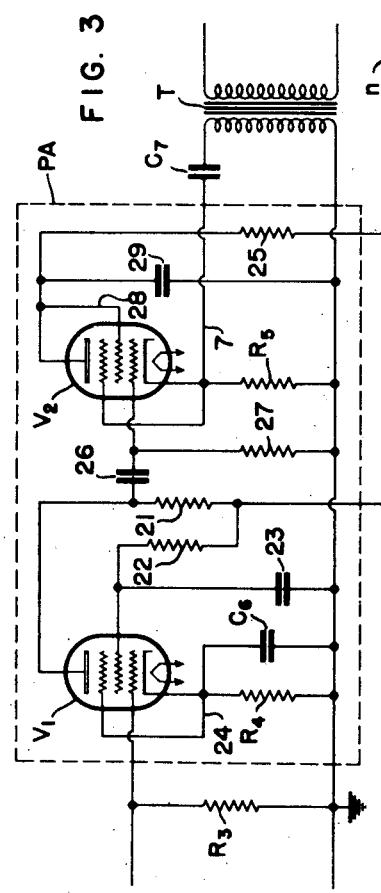
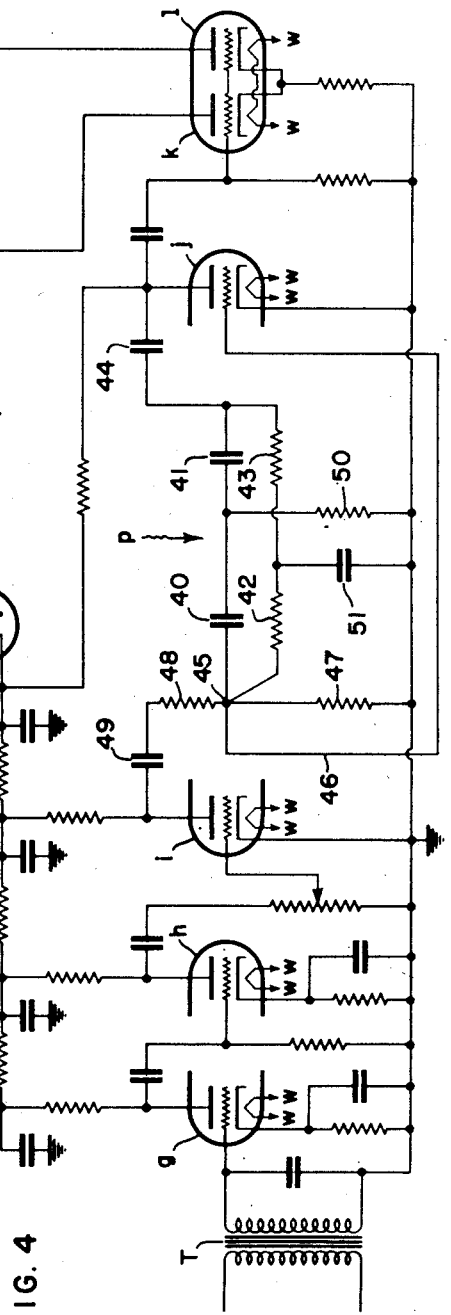
*INVENTOR.*
JAMES C. MOUZON
BY Arthur H. Swanson
ATTORNEY.

Patented Oct. 16, 1951

2,571,746

UNITED STATES PATENT OFFICE 2,571,746

CONVERSION APPARATUS

James C. Mouzon, Chevy Chase, Md., assignor to Minneapolis-Honeywell Regulator Company, Minneapolis, Minn., a corporation of Delaware Application May 6, 1950, Serial No. 160,469

9 Claims. (Cl. 318—28)

The general object of the present invention is to provide improved means for measuring very small unidirectional electrical quantities. One specific object of the invention is to provide apparatus of the above mentioned character comprising novel measuring means of the capacity rebalancing type, adapted for use in measuring the small voltages produced by pH electrodes and other voltage sources of relatively high internal impedance. The apparatus of the invention is also adapted for measuring the minute output currents of ionization chambers by measuring the voltages produced by such currents when the latter are passed through suitably high impedances.

A further specific object of the invention is to combine such measuring apparatus of the capacity rebalancing type with rebalancing mechanism of the general type disclosed in the Wills Patent 2,423,540, of July 8, 1947, and now in general use for measuring small unidirectional electrical quantities associated with relatively low impedance circuits, such as variations in thermocouple voltages.

A still further specific object is to combine the above apparatus with other apparatus including a preamplifier, thereby to form apparatus operative to measure unidirectional quantities in very much higher impedance circuits than can be measured by the measuring apparatus disclosed in the Wills patent. The present invention is adapted for use in processes in which a sensitive device having very good stability is needed, and is especially well adapted for use in measuring pH electrode voltages.

The apparatus disclosed in said Wills patent comprises a potentiometric measuring circuit in which a thermocouple, or other source of unidirectional voltage or current to be measured, is connected and produces a small unidirectional output signal when a change in the thermocouple voltage unbalances the measuring circuit. The apparatus disclosed in said patent also comprises vibratory contact apparatus for converting the unidirectional signal, produced when the measuring circuit is unbalanced, into an alternating current signal, and includes electronic voltage and power amplifying apparatus for amplifying said alternating current signal. Said disclosed apparatus also includes means for using the amplified signal in selectively controlling the direction of operation of an electric motor employed to adjust automatically the measuring circuit, when unbalanced, as required to rebalance that circuit. Ordinarily, the rebalancing motor also actuates means for recording the varying values of the quantity measured, and it may also serve other purposes.

In accordance with the present invention, the voltage developed by pH electrodes, or an analogous source of unidirectional voltage of high internal impedance, is connected in circuit with a known source of unidirectional voltage in the form of a standard cell, with one terminal of the unknown voltage source connected to the standard cell terminal of opposite polarity. The other two terminals of the unknown and standard cell voltage sources are connected by two condensers which are in series with one another and one of which is adjustable. The rebalancing mechanism normally operates to adjust the variable condenser as required to maintain the voltage across the standard cell and the condenser directly connected to one terminal of the standard cell equal to the voltage across the unknown voltage source and the condenser directly connected to the latter. When the measuring apparatus is thus balanced, the junction of the two condensers and the junction of the voltage sources are at the same potential, and the ratio of the voltages across the two sources is equal to the inverse ratio of the capacities of the two condensers respectively connected directly to the two voltage sources. In consequence, the adjustment condition of the variable condenser required to balance the measuring apparatus provides a measure of the variable unknown voltage.

The rebalancing apparatus disclosed in said Wills patent is characterized by its inclusion of means for converting a minute unidirectional voltage signal into an alternating voltage signal, so that the latter may be amplified by an electronic alternating current amplifying system without the instability and drift tendency of prior electronic apparatus used to amplify small unidirectional signals directly.

However, the apparatus of the aforementioned Wills patent is mainly concerned with the measurement of the minute voltages of sources having relatively low internal impedance, such as thermocouples. Thus, for example, the signal voltages commonly measured by apparatus of the general type disclosed in said Wills patent are of the order of fifty millivolts, and are produced by thermocouples having internal impedances of the order of from one to ten ohms. The present invention, on the other hand, is effective for use in measuring unidirectional voltages of the order of one to five hundred millivolts from sources having very high impedances of the order of megohms.

In accordance with the present invention, the conversion into an alternating current signal of the minute unidirectional signal existing when the measuring apparatus is unbalanced is effected by means of a vibratory condenser, instead of by means of a vibrating contact type converter such as that disclosed in the aforementioned Wills patent. While such contacting type converters are well adapted for converting minute unidirectional voltages in thermocouple and other relatively low impedance circuits, they are not as suitable as the vibrating condenser type converter for use in relatively high impedance circuits of the type with which the present invention is concerned. This is due to the fact that contacting converters used in relatively high impedance circuits introduce various noise and stray signal effects which may cause improper operation of the apparatus.

The conversion portion of the apparatus preferably used in the practice of the present invention is of a known type in which the source of the unidirectional voltage to be measured is connected across a vibratory condenser, one plate of which is vibrated relative to the other plate so as alternately to increase and decrease the distance between the plates at a suitable, predetermined frequency. That frequency may well be and is hereinafter assumed to be 60 cycles per second. The alternate decrease and increase in the distance between the plates of the vibratory condenser increases and decreases the capacity of that condenser and produces from a charge placed thereon an alternating voltage signal having said frequency. Mechanical energy is thus used to move the impressed charge in an electrostatic field, and is thus transmitted into electrical energy. The alternating voltage signal thus produced is a measure of the charge impressed on the vibratory condenser and is a measure, also, of the difference between the charges on the two condensers connected in series between the sources of the known and unknown voltages.

In the preferred form of the present invention, the vibratory condenser and an electronic preamplifier form parts of a preamplifier unit or section in which the minute unidirectional voltage to be measured is converted into an alternating current signal and is initially amplified, preparatory to its further amplification in the voltage amplifying the motor drive apparatus of a measuring and recording instrument of the general character disclosed in said Wills patent.

Since noise limits the sensitivity of a vibrating condenser measuring apparatus, the band width thereof should be made as narrow as possible to avoid overloading the amplifying apparatus. To this end, use is advantageously made of special provisions, disclosed in the Wild et al. Patent 2,475,576, of July 5, 1949, for eliminating 120 cycle and other random frequency signals from the output circuit of the voltage amplifier. While the present invention can be used in measuring unidirectional voltage signals of the magnitude developed in a potentiometric measuring system of relatively low impedance of the type disclosed in said Wills patent, the present invention is of especial utility in measuring the voltages develop by pH electrodes and other voltage sources of relatively high internal impedance. The preferred form of apparatus disclosed herein for measuring pH and analogous voltages is characterized by the fact that the preamplifier circuit of the apparatus may be readily formed and arranged to constitute a suitable impedance matching device between the high impedance input and condenser converter circuit and the relatively low impedance input circuit of the main amplifier and motor drive apparatus.

In the use of the present invention, leakage of the condensers connected between the terminals of the known and unknown voltage sources, and leakage of the vibratory condenser, may produce measuring inaccuracies unless suitable corrective means are provided, and one specific object of the present invention is to provide means for periodically short-circuiting each of the three last mentioned condensers at a suitable frequency: for example, once every minute.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

Of the drawings:

Fig. 1 is a diagram illustrating one embodiment of the present invention;

Fig. 2 is a diagrammatic representation of automatic switch mechanism for periodically short-circuiting certain of the condensers shown in Fig. 1;

Fig. 3 is a diagram illustrating in greater detail the preamplifier apparatus shown in Fig. 1; and Fig. 4 is a diagram illustrating in detail a desirable form of the alternating current amplifier directly controlling operation of the rebalancing motor shown in Fig. 1.

In the form of the invention illustrated diagrammatically in Fig. 1, E designates a relatively high impedance source of a minute unidirectional voltage to be measured. For example, the voltage source E may be a pH cell or a resistor through which flows the current of an ionization chamber. The measurement of the variable voltage of the source E is effected by comparing that voltage with the constant voltage of a standard cell Sc. As diagrammaticaly shown in Fig. 1, the negative terminal of the voltage source E is connected by a conductor 1 to the positive terminal of the cell Sc; the positive terminal of the voltage source E is connected to one terminal of a condenser $C_1$ and the negative terminal of the standard cell Sc is connected to one terminal of a variable condenser $C_2$; and the second terminals of the condensers $C_1$ and $C_2$ are connected by a conductor 2. As shown in Fig. 1, the conductor 1 is connected to ground, and serves as a grounding conductor for other elements of the circuit network which includes the voltage sources E and Sc.

The voltage sources E and Sc, the condensers $C_1$ and $C_2$, and the conductors 1 and 2, constitute a normally balanced measuring or comparison circuit B. The circuit B is in its balanced condition when the adjustment of the variable condenser $C_2$ is such that the product of the voltage of the unknown voltage source E and the capacity of the condenser $C_1$ is equal to the product of the voltage of the standard cell Sc and the capacity of the variable condenser $C_2$. In the balanced condition of the measuring circuit B, there is no potential difference between the conductors 1 and 2, and no potential difference between the output terminals of the circuit B. One of those terminals is the ground connection to the conductor 1, and the other output terminal is the conductor 3 which is connected to the conductor 2. A variation in the voltage of the unknown voltage source E which unbalances the circuit B creates a potential difference between the output terminals of the circuit B. That potential difference is used as hereinafter described to effect a selective operation of a rebalancing motor M and thereby adjust the capacity of the variable condenser $C_2$ as required to eliminate the potential difference between the conductors 1 and 2.

The conductor 3 connects the conductor 2 to one terminal of a resistor $R_1$. As shown, the latter has its second terminal connected by a conductor 4 to the stationary plate of a vibratory condenser $C_3$. The movable second plate of the condenser $C_3$ is connected to the grounding conductor 1. As diagrammatically shown, the movable plate of the condenser $C_3$ is given movements toward and away from the stationary plate of the condenser by an electromagnetic device comprising a coil 10 and an armature 11. The coil 10 has its terminals connected to a source of alternating current, and the armature 11 is magnetically polarized and oscillates with a frequency equal to the frequency of the alternating current energizing the coil 10.

In the preferred form of the invention, the vibrating structure of the vibrating condenser is designed to have a natural mechanical, or resonant, frequency substantially different from the energizing current frequency. For example, the resonant frequency may well be 80 cycles per second, when the energizing current frequency is 60 cycles per second as it may well be, and is assumed herein to be. With such a substantial difference between the two frequencies, there are no such phase displacements and no such variations in vibration amplitude as may be expected to result from mechanical vibrations of the vibrator or slight variations in the alternating current frequency when that frequency and the resonant frequency of the vibrating structure are approximately equal.

The mechanism for vibrating the movable condenser plate may take various forms, but preferably is of a character to insure a stable and relatively small amplitude of vibration, and of a type and form to minimize noise and other undesirable effects of stray electromagnetic and electrostatic forces. A desirable form of vibrating mechanism is disclosed and claimed in the concurrently filed application of Frederick W. Side, Serial No. 130,316, filed November 30, 1949. In the vibrating condenser disclosed in that application, the movable condenser plate is one inch in diameter and about .04 of an inch thick, and in operation, the distance between the movable plate and the stationary plate varies between a minimum of about .002 of an inch, and a maximum of about .04 of an inch.

The terminal conductor 3 is connected through the resistor $R_1$ and capacity coupling means to preamplifier apparatus PA, and is connected through the latter to a main voltage amplifier and motor drive mechanism A. The capacity coupling means shown in Fig. 1 comprises the conductor 4, a condenser $C_4$, a conductor 5, a condenser $C_5$, and a conductor 6, all connected in series in the order stated between the terminal 3 and the input circuit of the preamplifier PA. As shown, the latter comprises first and second stage electronic amplifier valves $V_1$ and $V_2$, and the conductor 6 is directly connected to the control grid of the valve $V_1$. The conductors 5 and 6 and the cathode of the valve $V_1$ are connected to the grounding conductor 1 by resistors $R_2$, $R_3$, and $R_4$, respectively, the resistor $R_4$ being shunted by a condenser $C_6$.

The cathode of the second stage amplifier valve $V_2$ is connected to ground by a resistor $R_5$, and is connected by a conductor 7 and a condenser $C_7$ to the terminal 8 of the primary winding of a transformer T. The second terminal 9 of said primary winding is connected to the grounded end of the resistor $R_5$. The secondary winding of the transformer T is included in the input circuit of the voltage and motor drive amplifier A which amplifies the alternating current control signal formed by the potential drop in the resistor $R_5$ and thus controls the operation of the rebalancing motor M. When the measuring circuit B is unbalanced as a result of a variation in the voltage of the source E, the motor M is set in operation by the amplifier A and adjusts the variable condenser $C_2$ as required to rebalance the circuit B.

The preamplifier PA shown in Fig. 1 is illustrated in greater detail in Fig. 3 wherein the two electronic valves $V_1$ and $V_2$ are shown as pentodes. They may well be of the commercially available 6AK5 type, though valves of other types may be used. Anode current is supplied to the valves $V_1$ and $V_2$ from a source of direct current through a conductor 20. The latter may be, for example, the output terminal of a filter in the output circuit of a rectifier. The anode of the valve $V_1$ is connected to the conductor 20 through a resistor 21. The cathode of the valve $V_1$ is connected to ground through the resistor $R_4$ and condenser $C_6$ and the control grid of the valve $V_1$ is connected to the conductor 6 as previously explained. The screen grid of the valve $V_1$ is connected to the direct current supply conductor 20 through a resistor 22 and is connected to ground through a condenser 23. The cathode and suppressor grid are directly connected by a conductor 24.

The anode of the valve $V_2$ is connected to the direct current supply conductor 20 through resistor 25. The cathode of the valve $V_2$ is connected to ground through the resistor $R_5$. The control grid of the valve $V_2$ is connected to the anode of the valve $V_1$ through a condenser 26 and is connected to ground through a resistor 27. The screen grid and anode of the valve $V_2$ are directly connected by a conductor 28 and are connected to ground through a condenser 29. As was explained in connection with Fig. 1, the cathode of the valve $V_2$ is connected through the conductor 7 and condenser $C_7$ to one terminal of the primary winding of the transformer T.

The voltage amplifier and motor drive unit A is diagrammatically shown in some detail in Fig.

4. The transformer T through which the output circuit of the preamplifier PA is coupled to the input circuit of the unit A, has one terminal of its secondary winding connected to ground and has its other terminal connected to the control grid of a valve $g$ constituting the first voltage amplifier stage of the unit A. The voltage amplifier comprises second, third and fourth stage amplifier valves $h$, $i$ and $j$, respectively. The anodes of each of the valves $g$, $h$, and $i$ are condenser coupled to the control grids of the valves $h$, $i$ and $j$, respectively. The valve $j$ has its anode coupled by a condenser to the control grid of each of the motor drive valves $k$ and $l$.

The anode of the valve $k$ is connected to one end, and the anode of the valve $l$ is connected to the second end of a secondary winding of a transformer $q$ which has it primary winding connected across branches of alternating current supply conductors L' and L². The cathodes of the various valves $g$, $h$, $i$, $j$, $k$ and $l$, are connected to ground. Anode current is supplied to the anodes of the valves $g$, $h$, $i$ and $j$ through a filter connected to the cathode of a diode rectifier $n$, to which anode current is supplied by a second secondary winding of the transformer $q$. A third secondary winding having terminals $w$ is shown as supplying heating current to the cathode heater elements of the different valves $g$, $h$, $i$, $j$, $k$, $l$ and $n$. A fourth secondary winding of the transformer $q$ having terminals $x$ may be provided to supply current to the energizing winding or coil 10 of the vibrator condenser C₃, and thus insure the proper frequency and phase relations of the voltages impressed on the input and output circuits of the motor drive valves $k$ and $l$. The conductors L' and L² may supply alternating current of any suitable frequency and voltage, as for example, 60 cycles per second and 115 volts.

The apparatus shown in Fig. 4 includes a parallel-T resistance-capacitance, frequency selective network $p$ of known type connected between the anode and the control grid of the valve $j$. Said network is referred to commonly, and hereinafter, as a "parallel-T RC filter network." Except for its inclusion of the last mentioned network, the apparatus shown in Fig. 4 does not differ in principle from the apparatus disclosed in the previously mentioned Wills patent, except that in the Wills patent the transformer T couples the voltage amplifier unit A directly to a vibrating contact converter, instead of to a preamplifier such as the preamplifier PA. In form, the apparatus shown in Fig. 4 differs from the Wills apparatus by its inclusion of the network $p$, and also in that the Wills patent amplifier includes three voltage amplifier stages only, instead of the four stages $g$, $h$, $i$ and $j$ of Fig. 4. However, the previously mentioned Wild et al. patent includes the fourth amplifier stage $j$ and the network $p$ and every other feature shown in Fig. 4. No need appears for further description of the features of the Fig. 4 circuit network shown alike in Fig. 4 and in one or both of the Wills and Wild et al. patents. Neither the fourth voltage amplifier stage nor the network $p$ is essential to the utilization of the present invention and may be dispensed with in many cases, if desired.

The parallel-T RC network $p$ shown in Fig. 4, comprises a pair of condensers 40 and 41 connected in parallel with a pair of resistors 42 and 43 which are connected in series with one another. The connected terminals of the condenser 41 and the resistor 43 are connected to the anode of the valve $j$ by a condenser 44. The connected terminals of the condenser 40 and resistor 42 are connected at a junction point 45. The junction point 45 is connected by a conductor 46 to the control grid of the valve $j$, and is connected to ground by a resistor 47, and is connected to the anode of the valve $i$ through a resistor 48 and condenser 49. The connected terminals of the condensers 40 and 41 are connected to ground through a resistor 50, and the connected terminals of the resistors 42 and 43 are connected to ground by a condenser 51.

The parallel-T RC network has such circuit component values that it is tuned to attenuate 60 cycle signals, while passing 120 cycle signals or other frequencies. In consequence, the device $p$ operates to feed back from the plate circuit to the control grid of the valve $j$ all signals having frequencies other than 60 cycles, but does not feed back 60 cycle signals to any great extent. Since the plate and grid signals of the amplifier valve $j$ are inherently 180° out of phase with each other, the signals fed back to the input circuit from the output circuit of the valve $j$ oppose corresponding signals which the output circuit of the valve $i$ impresses on the input circuit of the valve $j$. This results in a substantial reduction of signals other than 60 cycle signals reaching valves $k$ and $l$ from valve $j$. The reduction of 120 cycle signals and stray signals of frequencies other than 60 cycles, substantially eliminates the undesirable effects which would otherwise be produced by those signals.

For its purpose in attenuating 60 cycle signals while freely passing and feeding back other signals, circuit elements of the parallel-T RC filter network may have values approximately as follows: The condensers 40 and 41 may each have a capacity of 0.00025 microfarad; the condenser 51 may have a capacity of 0.005 microfarad; the resistors 42 and 43 may each have a resistance about one half megohm. As will be apparent, the use of the parallel-T RC filter network is of especial utility and value, as used herein, because of the unusually great need in the apparatus disclosed herein for high sensitivity and stability.

Condenser leakage in any of the condensers C₁, C₂ and C₃, and particularly in condensers C₁ and C₂, tends to produce measurement errors. Significant errors due to such leakage can be avoided by short circuiting each of said condensers at suitably frequent intervals. Fig. 2 diagrammatically illustrates by way of example, one automatic arrangement for periodically short circuiting each of the condensers C₁, C₂ and C₃. In the arrangement shown in Fig. 2, the conductor connection between the condenser C₁ and the positive terminal of the voltage source E comprises a pair of switch contacts 60 and 61, biased for and normally in engagement with each other. Similarly, the conductor connection between the variable condenser C₂ and the negative terminal of the standard cell Sc includes switch contact 62 and 63 biased for and normally in engagement with one another. A timing device 64 periodically separates the contacts 60 and 62 from the contacts 61 and 63, respectively, and at the same time moves each of the contacts 60 and 62 into engagement with a bridging contact or conductor 66. The latter is connected to the conductor 2, and engagement of the contact 60 with the contact 66 thus short circuits the condenser C₁, and the engagement of the bridging contact 66 by the contact 62 short circuits the condenser C₂.

In the arrangement shown, the contacts 60 and 62 are simultaneously moved out of engagement with the contacts 61 and 63, respectively, and into engagement with the bridging contact 66, by an armature 65 of insulating material which forms a part of the device 64 and normally maintains the contact 66 out of engagement with the contacts 60 and 62. When the timer 64 is periodically actuated, it moves the armature 65 in the direction and to the extent required to move the contacts 60 and 62 out of engagement with the contacts 61 and 63, respectively, and each into engagement with the bridging contact 66.

The frequency of the switch actuating movements of the armature 65 may well be of the order of once a minute, and, as those skilled in the art will understand, the timing device 64 may well be of one or another known type of electronic or mechanical timing device.

The apparatus for short circuiting the condenser $C_3$ may include an individual timing element similar to the element 64. As diagrammatically shown in Fig. 2, however, the timer 64 operates simultaneously to short circuit the three condensers $C_1$, $C_2$, and $C_3$. As shown in Fig. 2, the device 64 short circuits the device $C_3$ through means comprising the armature 65. To this end, the armature 65 is also associated with but insulated from switch contacts 70 and 72. Contact 72 is normally biased into engagement with a contact 73 while contact 70 is normally biased into engagement with a contact 71. As shown, the contacts 72 and 73 are connected between the condenser $C_3$ and the conductor 4 and the contacts 70 and 71 are included in the connection between the condenser $C_3$ and the grounding conductor 1. When the timer 64 is actuated, the armature 65 is actuated to move the switch contacts 70 and 72 out of engagement with the contacts 71 and 73, respectively, and each into engagement with a bridging contact 75 thereby to short circuit the condenser $C_3$.

The condenser short circuiting apparatus shown in Fig. 2 should be so designed that it does not add appreciable leakage resistance or stray capacitance to the circuit in which it is connected. Except as just noted, there is nothing critical or special about the design of the apparatus shown in Fig. 2.

The apparatus illustrated in the drawings is well adapted for its intended use in measuring the variable voltages of pH electrode voltage sources having internal impedances of the order of 50 megohms. The voltages developed by such pH electrode sources are ordinarily in the range of 100–300 millivolts. In the operation of the apparatus illustrated, when the measuring or comparison circuit B is in its normal balanced condition, the capacitances of the condensers $C_1$ and $C_2$ are so related to the voltages across the voltage sources E and Sc, that the potential of the conductor 2 is the same as the potential of the grounded conductor 1. On a variation in the voltage across the variable voltage source E, a potential difference between the conductors 1 and 2 is created. When such a potential difference develops, the vibratory condenser $C_3$ operates to convert the unidirectional voltage signal then transmitted from the conductor 2 to ground through the resistor $R_1$, into an alternating current signal of a frequency which is the same as the vibration frequency of the movable plate of the condenser $C_3$.

The alternating current signal thus produced is amplified by the amplifying elements PA and A, and the latter impresses a control signal on the motor M. In response to that signal, the motor M operates to rebalance the measuring circuit by varying the relative capacitances of the condensers $C_1$ and $C_2$ so that the ratio of those capacitances will be equal to the inverse ratio of the voltages of the corresponding sources. In the balanced condition of the circuit B, the relative values of the voltages and capacitances is expressed by the equation $ec' = c''s$, when $e$ represents the voltage of the variable source E, $s$ represents the voltage of the standard cell Sc, and $c'$ and $c''$ represent the respective capacitances of the condensers $C_1$ and $C_2$. In ordinary practice, the condenser $C_1$ is of fixed capacity, and the condenser $C_2$ is a variable condenser, the capacity of which is dependent on its adjustment. In consequence, the adjustment condition of the condenser $C_2$ is a measure of the capacitance of that condenser and in the balanced condition of the apparatus is a measure of the voltage of the source E.

In my prior application, Serial No. 130,275, filed November 30, 1949, I have disclosed apparatus for measuring a unidirectional voltage including a vibratory condenser, a preamplifier and a voltage and motor drive amplifier, similar in general character to the elements $C_3$, PA and A of the apparatus illustrated herein. In the present application as in said prior application, the preamplifier satisfies the need for a suitable impedance matching device for the high internal impedance of the variable voltage source E, connected between the condenser converter circuit and the relatively low impedance input circuit of the amplifier A.

The apparatus disclosed in my said prior application is especially adapted for use in measuring the current output of an ionization chamber, having an internal impedance substantially higher than the internal impedance of a pH voltage source, and having a unidirectional current output producing a voltage substantially smaller than that of the pH voltage source.

Notwithstanding the similarities in conversion and amplifying provisions, the measuring apparatus including the measuring circuit B disclosed and claimed herein, is quite different in character from and inherently less complex than the measuring apparatus of said prior application. In consequence, certain apparatus features, including special automatic calibrating provisions of the apparatus disclosed in my prior application are unnecessary in, and are omitted from, the apparatus illustrated herein. Because of the differences in operating conditions, the operation of the vibratory condenser of my prior application presented a contact potential problem, and a resultant need for compensation for contact potential variations, which do not arise, and are not discussed herein. While in the practice of the present invention use may well be made of the vibratory condenser construction disclosed and claimed in the previously mentioned Side application, other forms of vibratory condenser mechanism may be used.

The circuit elements associated with the valve $V_2$ are so chosen and proportioned that the effective input capacitance and the effective output impedance of that valve are each so relatively low that the valve $V_2$ serves in effect as a cathode follower stage for the valve $V_1$. In effect, therefore, the valve $V_1$ constitutes the single amplification stage of the preamplifier PA.

In the practical use of the apparatus shown diagrammatically in Figs. 1 and 3, significant resistance and capacitance values may be as follows:

Resistance of resistor $R_1$ is 5,000 megohms
Resistance of resistor $R_2$ is 5,000 megohms
Resistance of resistor $R_3$ is 5,000 megohms
Resistance of resistor 21 is 0.56 megohm
Resistance of resistor 22 is 1.8 megohms
Resistance of resistor 27 is 1.8 megohms
Resistance of resistor $R_5$ is 470 ohms
Resistance of resistor $R_4$ is 10,000 ohms
Resistance of resistor 25 is 68,000 ohms Capacitance of condenser $C_1$ is 330 micromicrofarads
Capacitance of condenser $C_2$ is 30-120 micromicrofarads
Capacitance of condenser $C_3$ is 16-25 micromicrofarads
Capacitance of condenser $C_3$ is 20 at rest micromicrofarads
Capacitance of condenser $C_4$ is 15 micromicrofarads
Capacitance of condenser $C_5$ is 40 micromicrofarads
Capacitance of condenser $C_6$ is 25 microfarads
Capacitance of condenser 23 is 0.1 microfarad
Capacitance of condenser $C_7$ is 25 microfarads
Capacitance of condenser 26 is 0.01 microfarad
Capacitance of condenser 29 is 10 microfarads In choosing the circuit component values listed above, due account was taken of the desirability of choosing values readily obtainable in practice. The resistance of the resistor $R_1$ and the capacitance of the vibratory condenser $C_3$ were also so chosen that the time constant $(R_1)$ $(C_3)$ is long in comparison with the duration of a single cycle of operation of the condenser converter, assumed to be one sixtieth of a second, but is short in comparison with the desirable speed of response of the apparatus. The capacitance of the condenser $C_4$ selected is desirably close to the variable capacitance of the vibratory condenser $C_3$ and the use of such relative capacitances, necessitates the use of the relatively high resistance value of the resistor $R_2$.

The network including the components $C_4$, $C_5$, $R_2$ and $R_3$ in the apparatus disclosed herein serves the purpose of isolating from the condenser converter any voltage developed across the grid resistor $R_3$ of the preamplifier valve $V_1$.

The measuring apparatus disclosed herein can be used to measure voltages of various voltage sources, some of which are quite different in character from pH electrode elements. The invention is of especial utility in measuring the voltages of pH electrode elements, although the invention is not restricted to use in the measurement of minute voltages or currents developed by high impedance sources. It can be used, for example, in measuring thermocouple voltages and currents.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the annended claims and that in some cases certain features of my invention may be used to advantage without a corresponding use of other features.

Having now described my invention, what I claim as new and desire to secure by Letters Patent is as follows:

1. In apparatus for measuring a minute unidirectional voltage developed across a variable voltage source having relatively high internal impedance, the combination of first and second measuring terminals adapted for connection to the respective terminals of opposite polarity of the relatively high impedance source of minute unidirectional voltage to be measured, a source of substantially constant unidirectional voltage having first and second reference terminals of opposite polarity, said first measuring terminal and said first reference terminal being of opposite polarity, circuit means connecting together said first measuring and reference terminals at a first junction, first and second condensers connected in series between said second measuring and reference terminals, said condensers being connected at a second junction, whereby a potential difference is adapted to appear between said first and second junctions having a magnitude dependent upon the magnitudes of the voltages between said measuring terminals and said reference terminals and the capacities of said condensers, modulating means including a variable condenser and a driving portion operative to produce regularly recurring variations of approximately equal magnitude in the capacity of said variable condenser, circuit means connecting said variable condenser and a resistor of relatively high resistance in series between said first and second junctions, whereby a regularly varying voltage signal is adapted to appear across said variable condenser having a magnitude dependent upon that of said potential difference, and responsive means connected across said variable condenser and responsive to the magnitude of said signal and hence to the magnitude of said potential difference.

2. Apparatus as specified in claim 1, wherein there is included a timing device and switching means periodically actuated by said device and operative when so actuated to short circuit and hence discharge each of said condensers momentarily, thereby to minimize the effects of condenser leakage on the measuring accuracy of the apparatus.

3. Apparatus as specified in claim 1, wherein there is included a timing device and switching means periodically actuated by said device at a rate of approximately once each minute and operative when so actuated to short circuit and hence discharge each of said condensers momentarily, thereby to minimize the effects of condenser leakage on the measuring accuracy of the apparatus, and wherein said driving portion of said modulating means is operative to vary the capacity of said variable condenser through a variation cycle at a rate of approximately sixty times per second.

4. Apparatus as specified in claim 1, wherein the internal impedance of the source of voltage to be measured is of the order of fifty megohms, wherein the resistance of said resistor is of the order of 5000 megohms, and wherein the average capacity of said variable condenser is of the order of 20 micromicrofarads.

5. Apparatus as specified in claim 1, wherein the source of voltage to be measured comprises a pair of pH electrodes.

6. Apparatus as specified in claim 1, wherein one of said first mentioned condensers is a variable condenser, and wherein there are included adjusting means operable to adjust the last mentioned variable condenser to vary the capacity thereof as required to maintain substantially zero potential difference between said first and second junctions, whereby the capacity and hence the adjustment position of said last mentioned variable condenser are a measure of the value of the minute voltage to be measured.

7. Apparatus as specified in claim 6, wherein said responsive means include electronic alternating current amplifying means having an input circuit connected across the first mentioned variable condenser, having an output circuit, and operative to produce in said output circuit an amplified signal of a magnitude varying in accordance with that of the voltage signal appearing across said first mentioned variable condenser, and a responsive device connected to said output circuit and responsive to the magnitude of said amplified signal and hence to the magnitude of said potential difference.

8. Apparatus as specified in claim 7, wherein said responsive device includes motor control means having an input portion connected to said output circuit and having an output portion, and wherein said adjusting means include a reversible electric motor electrically connected to said output portion, controlled by said control means, and operative in response to said voltage signal to adjust said last mentioned variable condenser to vary the capacity thereof as required to maintain said voltage signal at substantially zero magnitude, corresponding to substantially zero potential difference between said first and second junctions, whereby said motor maintains the capacity and hence the adjustment position of said last mentioned variable condenser in correspondence with the value of the minute voltage to be measured.

9. Apparatus as specified in claim 7, wherein one terminal of said first mentioned variable condenser is connected through said resistor to said second junction, wherein the other terminal of said first mentioned variable condenser is directly connected to said first junction, wherein said amplifying means includes a first stage electronic amplifier valve having a control grid and a cathode included in said input circuit, and wherein there are included two additional condensers connected in series between said control grid and said one terminal of said first mentioned variable condenser and having a common terminal, a second resistor connected between said control grid and said first junction, circuit means connecting said cathode to said first junction and hence to said other terminal of said first mentioned variable condenser, and a third resistor connected between the common terminal of the two last mentioned condensers and said first junction, whereby said first mentioned variable condenser is effectively isolated from voltages developed across said second resistor due to grid current flow therethrough.

JAMES C. MOUZON.

No references cited.